United States Patent
Hunter

[11] Patent Number: 5,891,373
[45] Date of Patent: Apr. 6, 1999

[54] PROCESS OF MAKING A MULTI-LAYER TUBE

[75] Inventor: Robin B. Hunter, Spratton, England

[73] Assignee: Eagle-Picher Industries, Inc., Cincinnati, Ohio

[21] Appl. No.: 822,674

[22] Filed: Mar. 24, 1997

Related U.S. Application Data

[60] Provisional application No. 60/018,171 May 23, 1996.

[51] Int. Cl.$^6$ ..................................................... B29C 47/06
[52] U.S. Cl. ............... 264/104; 156/244.13; 264/171.27; 264/171.28; 264/173.16; 264/173.19
[58] Field of Search ............................... 264/104, 171.27, 264/171.28, 173.16, 173.19; 156/244.13

[56] References Cited

U.S. PATENT DOCUMENTS

| | | | |
|---|---|---|---|
| 3,376,181 | 4/1968 | Larson et al. . | |
| 4,370,186 | 1/1983 | Blandin et al. . | |
| 4,643,927 | 2/1987 | Luecke et al. | 264/171.27 X |
| 4,886,689 | 12/1989 | Kotliar et al. . | |
| 5,170,011 | 12/1992 | Martucci . | |
| 5,284,184 | 2/1994 | Noone et al. | 138/121 |
| 5,383,087 | 1/1995 | Noone et al. | 361/215 |
| 5,419,374 | 5/1995 | Nawrot et al. | 138/137 |
| 5,437,311 | 8/1995 | Reynolds . | |
| 5,460,771 | 10/1995 | Mitchell et al. | 264/508 |
| 5,469,892 | 11/1995 | Noone et al. | 138/121 |
| 5,474,109 | 12/1995 | Stoeppelmann et al. . | |
| 5,480,721 | 1/1996 | Pozzoli et al. . | |
| 5,500,257 | 3/1996 | Krause et al. . | |
| 5,580,405 | 12/1996 | Palmer . | |

FOREIGN PATENT DOCUMENTS

| | | | |
|---|---|---|---|
| 2082448 | 12/1971 | France | 156/244.13 |
| 5-96600 | 4/1993 | Japan | 264/171.27 |

*Primary Examiner*—Leo B. Tentoni
*Attorney, Agent, or Firm*—Wood, Herron & Evans, LLP

[57] ABSTRACT

A multi-layer hydrocarbon vapor-impermeable tube is formed with a nylon outer layer and a vapor barrier inner layer such as ETFE, bonded together by two adhesive layers. The laminated tube is coextruded. The shear on the two adhesive layers are adjusted to bias the first adhesive layer towards the nylon outer layer and the second adhesive layer towards the ETFE barrier layer. This permits rapid coextrusion of the laminated tubing. Preferably, both adhesive layers are formed from a blend of nylon and ETFE. The ratio of nylon to ETFE can be adjusted so that the first adhesive layer is preferentially adherent to the nylon layer, and the second adhesive layer is preferentially adherent to the ETFE layer, and both adhesive layers are adherent to each other.

8 Claims, 1 Drawing Sheet

PROCESS OF MAKING A MULTI-LAYER TUBE

This is a provision of Ser. No. 60/018,171 filed May 23, 1996.

BACKGROUND OF THE INVENTION

Hydrocarbon emissions have become a major concern with environmental agencies throughout the world. One way to reduce hydrocarbon emissions from automobiles is to prevent hydrocarbon vapor emissions through fuel lines and vapor lines. In the past, these fuel lines have been formed from nylon which is particularly strong, but has relatively poor hydrocarbon vapor barrier characteristics. A solution to this has been to provide a laminated fuel line having one or more layers that provide improved barrier characteristics laminated to nylon. Fuel lines, as opposed to vapor lines, also require an inner conductive layer to permit dissipation of static charge created as the fuel passes through the fuel line.

Most of the barrier layers tend to be fluorinated hydrocarbons such as ethylene tetrafluoroethylene (ETFE) and polytetrafluoroethylene (PTFE). The problem with these barrier layers is they do not adhere well to nylon. Plasma treatment of the fluorinated hydrocarbon polymers has been employed and is successful to some extent, but still suffers problems with delamination and further, is relatively expensive. Noone et al. U.S. Pat. No. 5,383,087 discloses using an outer nylon layer bonded to an inner barrier layer by a compatibilizing adhesive. Unfortunately, in practice it is very difficult to get both the nylon and the fluorinated polymer to both adhere to the compatibilizing adhesive.

SUMMARY OF THE INVENTION

The present invention is premised on the realization that a polyamide or nylon outer layer can be laminated to a fluorinated polymer inner layer by a dual adhesive layer. These four layers are coextruded together with the inner adhesive layer, adjacent the outer surface of the fluorinated polymer, extruded under high shear conditions, whereas the outer adhesive layer adjacent the nylon is extruded under low shear conditions. This causes the inner layer to be biased toward the fluorinated polymer layer and the outer layer to be biased toward the nylon layer.

The adhesives can be the same or different adhesives. Different adhesives can be selected to promote further adhesion between the respective nylon and fluorinated polymer layers. Further, the present invention can include an innermost conductive layer formed from a carbon or metal-impregnated fluorinated polymer.

The objects and advantages of the present invention will be further appreciated in light of the following detailed description and drawings in which:

DETAILED DESCRIPTION

Figure 1:
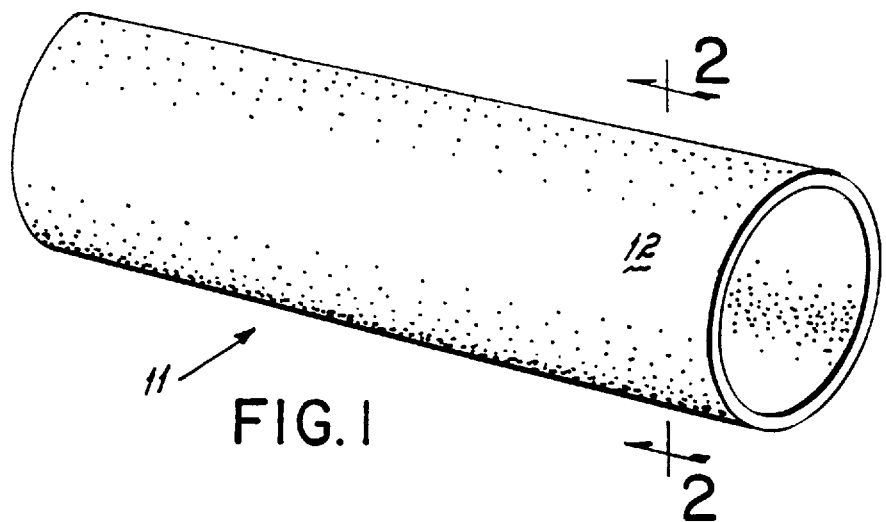
FIG. 1 is a perspective view of a fuel line made according to the present invention.
Figure 2:
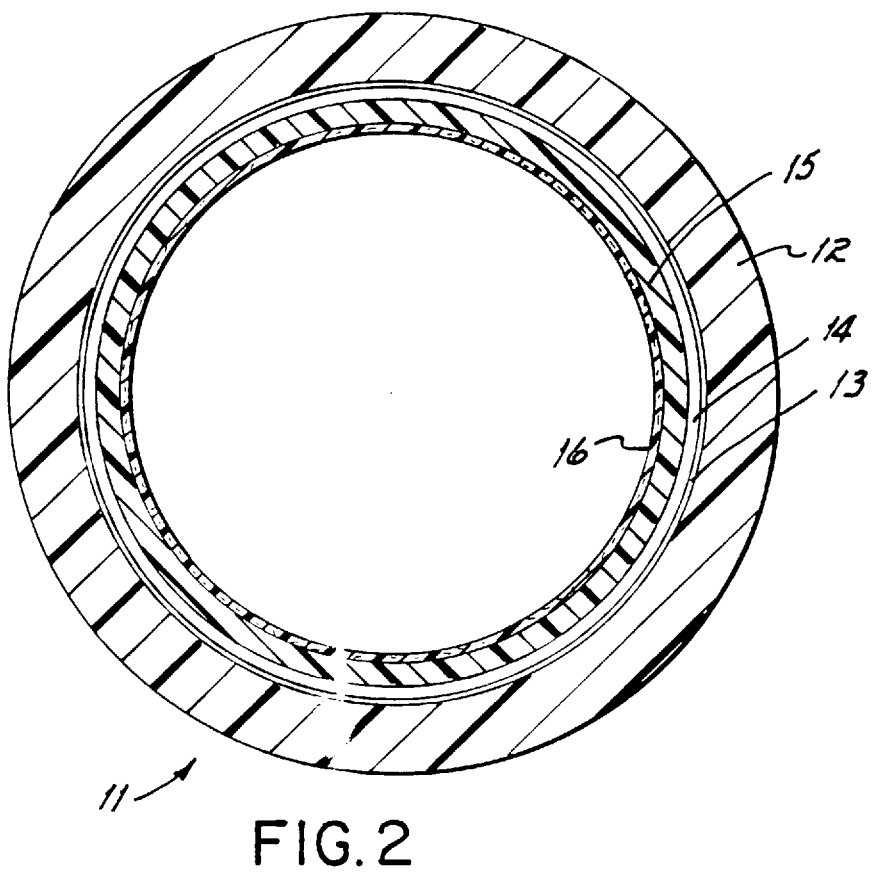
FIG. 2 is a cross-sectional view taken at lines 22 of FIG. 1.

The present invention is a laminated tube 11 adapted to transport either fuel or hydrocarbon vapors. The tube 11 includes an outer layer 12 which is a cold impact resistant layer, preferably formed from a polyamide and most particularly formed from a nylon. Adjacent outer layer 12 is a first compatibilizing adhesive layer 13. Adjacent first compatibilizing adhesive layer 13 is a second compatibilizing adhesive layer 14. These two layers combined promote the adhesion of the nylon layer 12 to a barrier layer 15. The innermost layer adhered to the barrier layer 15 is an optional conductive layer 16.

All layers are formed from melt-processable thermoplastics. The outer layer 12 may be composed of any melt-processable, extrudable, thermoplastic material which is resistant to ultraviolet degradation, extreme changes in heat, exposures to environmental hazards such as zinc chloride, and degradation upon contact with engine oil and brake fluids. These are all standard requirements for a fuel line. In general, the exterior layer is formed from a polyamide, preferably nylon 11, nylon 12 or nylon 6. These thermoplastic materials are commercially available under trademarks such as Santoprene, Kraten, Seralink and Vichem. The nylon outer layer can have a thickness of about 685 microns to about 715 microns, with about 700 microns preferred.

Compatibilizing adhesive layer 13 adjacent layer 12 is a thermoplastic material which is adherent to the nylon layer 12 and also adherent to the second compatibilizing adhesive layer 14. Suitable adhesive layers would include melt-processable thermoplastic fluoroplastic polymers such as polyvinylfluoride compounds including polyvinylidene fluoride polymers, polyvinyl fluoride polymers, and mixtures thereof. Particularly suitable is a blend of a fluorinated polymer adhesive and a polyamide adhesive. One such adhesive is sold under the trademark Daiken DUX43J. This adhesive is about 60% nylon and 40% ETFE by weight.

The first compatibilizing adhesive layer 13 can be extremely thin and generally will be about 10 microns to 15 microns. Generally, its thickness will depend upon the processing conditions, as discussed below. A preferred thickness is about 10 microns.

The second compatibilizing adhesive layer 14 can be any adhesive layer which is compatible with both the barrier layer 15 and the first compatibilizing adhesive layer. Both adhesive layers 13 and 14 can be the same material or different blends of the same materials. In one preferred embodiment, the first compatibilizing adhesive is a blend of polyamide (nylon) and fluorinated polymer. The second compatibilizing adhesive layer is also a blend of polyamide and fluorinated polymer. But the first compatibilizing adhesive layer has added polyamide to promote adhesion with the nylon outer layer. In other words, the first compatibilizing adhesive is preferentially adherent to the nylon layer relative to the barrier layer. The is effected by increasing the percentage of nylon in the adhesive. Likewise, the second compatibilizing adhesive should be preferentially adherent to the barrier layer, relative to the nylon layer. This is effected by increasing the fluorinated polymer content of the second compatibilizing adhesive. The second adhesive would be the Daiken DUX43J with added ETFE to provide a 40% nylon/60% ETFE blend by weight.

The thickness of the second compatibilizing adhesive layer again will be determined by processing conditions, as discussed below. Generally, its thickness will be 80 to 100 microns with 90 microns preferred.

The barrier layer 15 is again a melt-processable, thermoplastic material. Generally, this will be a fluorinated polymer. Preferred materials include polytetrafluoroethylene, ethylene tetrafluoroethylene, and polyvinylidene fluoride. Ethylene tetrafluoroethylene can be purchased from Daiken under the trademark EP 160.

Optionally, the tube can include an innermost conductive layer 16 which would be used for fuel lines. This would not be included for vapor return lines. The conductive layer will be a carbon fiber or metal-impregnated material which is compatible with the barrier layer 15. It will generally be formed from the same polymer as layer 15 impregnated with a sufficient amount of conductive materials to dissipate an electrostatic charge in the range of $10^{-4}$ to $10^{-9}$ ohm/cm$^2$. Conductive metals include copper, silver, gold, nickel, silicon and mixtures thereof, however carbon fibers are preferred. The amount of conductive material contained in this layer is 5% to 10% by weight. One such conductive material can be purchased from Daiken EP610AS.

The tube of the present invention is formed by coextrusion. The temperatures and flow rates will vary depending upon the particular polymer. However, with respect to the first and second compatibilizing adhesive layers 13 and 14, the flow rates are adjusted to manipulate shear to promote adhesion to the outer nylon layer and the inner barrier layer, respectively. Generally, high shear conditions promote the adhesion of the second compatibilizing adhesive layer 14 to the barrier layer 15. Likewise, low shear characteristics bias the first compatibilizing adhesive layer 13 toward the nylon layer. This promotes adhesion between the respective layers and greatly improves cold impact delamination characteristics.

The tube 11 is formed by coextruding all four or five layers (depending upon whether the inner conductive layer is present). Improved adhesion is obtained by manipulating the two adhesive layers 13 and 14 to produce a bias either toward the ETFE or the nylon, thereby using two layers of adhesive and manipulating them to create a bias toward nylon 12 on the fourth layer and a bias toward ETFE on the third layer. Further, one can improve relative adhesion to the barrier layer and the nylon layer, respectively, by selecting two different adhesives, each having preference for these respective layers. However, the adhesive layers must be compatible and adhesive to each other.

The invention will be further appreciated in light of the following detailed example.

EXAMPLE

A laminated tube used for the fuel line is formed with an outer layer 12 of nylon 12 supplied by UBE Chemical of Japan, having a thickness of 700 microns. The first compatibilizing adhesive layer 13 is formed from a blend of nylon and ethylene tetrafluoroethylene supplied by Daiken Chemical, also of Japan. Its thickness is 10 microns. The second compatibilizing adhesive layer 14 is formed from the same adhesive as layer 13, and has a thickness of 90 microns. The barrier layer 15 is formed from nonconductive ETFE supplied by Daiken and has a thickness of 150 microns. The inner conductive layer 16 is conductive ETFE sold by Daiken and has a thickness of 50 microns. These are coextruded using the following extruder settings with Extruder 1 used to extrude the inner conductive layer, Extruder 2 the barrier layer, Extruder 3 the second compatibilizing adhesive layer, Extruder 4 the first compatibilizing adhesive layer, and Extruder 5 the nylon layer.

PROCESS SPECIFICATIONS

| | Extruder Temperature Settings (°C.) | | | | |
|---|---|---|---|---|---|
| | Extruder 1 Size 30 mm | Extruder 2 Size 45 mm | Extruder 3 Size 30 mm | Extruder 4 Size 30 mm | Extruder 5 Size 45 mm |
| Zone 1 | 300 | 300 | 210 | 210 | 210 |
| Zone 2 | 300 | 300 | 225 | 225 | 230 |
| Zone 3 | 310 | 300 | 230 | 230 | 240 |
| Zone 4 | 310 | 310 | 240 | 240 | 240 |
| Zone 5 | 310 | 310 | 240 | 240 | 240 |

The extruders were all set to the parameters listed above and extruder speeds adjusted to meet the layer thicknesses previously referenced. The carbon-filled layer of ETFE acts as a conductive layer for the fuel tube. The carbon-filled layer is of the same material as the ETFE nonconductive layer and accordingly adheres to this. This nonconductive ETFE acts as the barrier layer. The adhesive, when subjected to shear, has an effect on its ability to adhere to either nylon 12 or ETFE. Using two extruders for the adhesive layer changes the bias of the adhesive to have good adhesion to the nylon layer through extruder 4 and the ETFE through extruder 3. This method is not affected by pressure or linear speed and therefore the process is more stable with a larger window for success. The produced tube easily withstood industry-standard cold impact tests without delaminating and accordingly is useful as a fuel line for automobiles.

This has been a description of the present invention, along with the preferred method of practicing the invention. However, the invention itself should only be defined by the appended claims wherein

I claim:

1. A method of forming a multi-layer tube for hydrocarbon transmission comprising an outermost protective layer, an inner hydrocarbon barrier layer, and a first and second compatibilizing adhesive layer, wherein said multilayer tube is formed by simultaneously coextruding the four layers, wherein the first compatibilizing adhesive layer is biased toward said protective layer, and said second compatibilizing adhesive layer is biased toward said barrier layer.

2. The method claimed in claim 1 wherein said protective layer is nylon.

3. The method claimed in claim 1 wherein said first and second compatibilizing adhesive layers are formed from the same material.

4. The method claimed in claim 1 further comprising coextruding an innermost conductive layer adhered to said barrier layer.

5. The method claimed in claim 2 wherein said barrier layer is a fluoropolymer.

6. The method claimed in claim 5 wherein said first and second compatibilizing adhesive layers comprise a blend of nylon and fluoropolymer.

7. The method claimed in claim 2 wherein said first compatibilizing adhesive is preferentially adherent to said outermost nylon layer, and said second compatibilizing adhesive layer is preferentially adherent to said hydrocarbon barrier layer, and said first and second compatibilizing adhesive layers are adherent to each other.

8. The method claimed in claim 6 wherein said first compatibilizing adhesive layer has a higher percentage by weight of nylon than fluoropolymer.

* * * * *